US012613532B2

(12) United States Patent
Ignatov et al.

(10) Patent No.: US 12,613,532 B2
(45) Date of Patent: Apr. 28, 2026

(54) SYSTEM AND METHOD FOR THREE-DIMENSIONALLY SECURING A LOAD-HANDLING ENVIRONMENT OF LOAD-HANDLING KINEMATICS IN A CHANGING WORK ENVIRONMENT

(71) Applicant: STILL GmbH, Hamburg (DE)

(72) Inventors: Marina Ignatov, Kiel (DE); Dennis Schüthe, Buchholz (DE); Bengt Abel, Lüneburg (DE); Ralf König, Adendorf (DE)

(73) Assignee: STILL GmbH, Hamburg (DE)

( * ) Notice: Subject to any disclaimer, the term of this patent is extended or adjusted under 35 U.S.C. 154(b) by 130 days.

(21) Appl. No.: 18/702,875

(22) PCT Filed: Oct. 11, 2022

(86) PCT No.: PCT/EP2022/078203

§ 371 (c)(1),
(2) Date: Apr. 19, 2024

(87) PCT Pub. No.: WO2023/066713

PCT Pub. Date: Apr. 27, 2023

(65) Prior Publication Data

US 2025/0244770 A1      Jul. 31, 2025

(30) Foreign Application Priority Data

Oct. 21, 2021      (DE) ..................... 10 2021 127 337.4

(51) Int. Cl.
G05D 1/617          (2024.01)
G05D 1/242          (2024.01)
          (Continued)
(52) U.S. Cl.
CPC ............. G05D 1/617 (2024.01); G05D 1/242 (2024.01); G05D 1/2465 (2024.01);
          (Continued)

(58) Field of Classification Search
None
See application file for complete search history.

(56) References Cited

U.S. PATENT DOCUMENTS

| | | | |
|---|---|---|---|
| 11,762,390 B1 * | 9/2023 | Alagic | G06F 18/211 |
| | | | 701/23 |
| 2017/0021502 A1 | 1/2017 | Nusser et al. | |

(Continued)

OTHER PUBLICATIONS

Doliotis et al., "A 3D Perception-based Robotic Manipulation System for Automated Truck Unloading", 2016 IEEE International Conference on Automation Science and Engineering (CASE), Aug. 21-24, 2016, pp. 262-267 (Year: 2016).*

(Continued)

*Primary Examiner* — Tamara L Weber
(74) *Attorney, Agent, or Firm* — The Webb Law Firm

(57)          ABSTRACT

A system for the securing of a load handling environment of load handling kinematics (30) in a changing working environment includes an environment sensing unit, which is designed to acquire data of the load handling environment and an environment monitoring unit that is in an operational connection with the environment sensing unit. The environment monitoring unit is designed to analyze the data so that an open space (7) surrounding a load to be handled, a work space (12, 13, 14, 60) defined by a movement space of the load handling kinematics (30) and a process space (40, 50) is determined by addition of the work space (12, 13, 14, 60) and a distance space. The environment monitoring unit is configured to at least partly monitor the distance space and/or the process space (40, 50).

21 Claims, 9 Drawing Sheets

(51) Int. Cl.

| | |
|---|---|
| *G05D 1/246* | (2024.01) |
| *G05D 1/644* | (2024.01) |
| *G05D 1/667* | (2024.01) |
| *G05D 105/28* | (2024.01) |
| *G05D 107/70* | (2024.01) |

(52) U.S. Cl.
CPC ........... *G05D 1/6445* (2024.01); *G05D 1/667* (2024.01); *G05D 2105/28* (2024.01); *G05D 2107/70* (2024.01)

(56) References Cited

U.S. PATENT DOCUMENTS

| | | |
|---|---|---|
| 2019/0147655 A1 | 5/2019 | Galera et al. |
| 2019/0262993 A1 | 8/2019 | Cole et al. |
| 2020/0223066 A1* | 7/2020 | Diankov .............. G06Q 10/087 |
| 2021/0053227 A1 | 2/2021 | Wartenberg et al. |
| 2021/0308862 A1 | 10/2021 | Lin et al. |

OTHER PUBLICATIONS

Zhang et al., "DoraPicker: An Autonomous Picking System for General Objects", 2016 IEEE International Conference on Automation Science and Engineering (CASE), Aug. 21-24, 2016, pp. 721-726 (Year: 2016).*

* cited by examiner 18,19          20

21

Acquisition of data from the load handling environment — 101

Evaluation of the data — 102

103 — determination of an open space determination of a distance space — 105

104 — determination of a work space determination of a process space — 106

At least the partial monitoring of at least the distance space and/or of the process space — 107

SYSTEM AND METHOD FOR THREE-DIMENSIONALLY SECURING A LOAD-HANDLING ENVIRONMENT OF LOAD-HANDLING KINEMATICS IN A CHANGING WORK ENVIRONMENT

CROSS-REFERENCE TO RELATED APPLICATIONS

This application is the United States national phase of International Application No. PCT/EP2022/078203 filed Oct. 11, 2022, and claims priority to German Patent Application No. 10 2021 127 337.4 filed Oct. 21, 2021, the disclosures of which are hereby incorporated by reference in their entireties.

BACKGROUND OF THE INVENTION

Field of the Invention

This invention relates to a system for securing a load handling environment of load handling kinematics in a changing working environment with an environment sensing unit and an environment monitoring unit operatively connected with the environment sensing unit, a logistics robot and a method for securing a load handling environment of load handling kinematics in a changing working environment.

Description of Related Art

Robots are increasingly used in industry and in logistics operations to automate industrial manufacturing processes as well as in logistics tasks such as order picking, for example. The robots most commonly used in these operations are robots with arm manipulators, in particular robot arms. Articulated arm robots are an example of this type of robot.

In modern industrial automation, robotic applications of arm manipulators are generally operated in separate work spaces that are generally designed in the form of safety cages monitored by sensors. In one current development, the prior art includes initial collaborative robotic concepts in which human beings and robots work in the same working environment. In collaborative robotic concepts of this type, however, the working speed of the robots is severely limited for safety reasons. The collaborative speed of the robot is typically a maximum of 250 mm/s. Moreover, robotic concepts of this type result in very high product costs on account of the need for safety-relevant force and torque sensors. In addition, robots of this type can frequently lift only very small live loads (in the range of a few kilograms), which results in an unfavorable ratio of live load to dead load.

The majority of modern robotic solutions can be characterized as stationary robot solutions because the robot arms are either anchored to the floor in a stationary manner or are mounted so that they can move on a linear axis. The result is a severely restricted work space that is conventionally partitioned off by security fencing.

There have been initial mobile approaches with robot arms on freely movable platforms. Examples include automated guided vehicles (AGVs) as well as driverless industrial trucks, in particular mobile order-picking robots. However, and in particular for safety reasons, these solutions cannot be used in mixed operation without a spatial separation from human operators.

To eliminate the need for permanently installed security fencing, initial approaches include virtual security fences, in which the open area around a stationary robot is monitored by means of appropriate sensors, such as laser scanners, for example. When the protected area defined by the virtual security fencing is violated, the robot is safely limited in its movements or de-energized.

On account of the spatial separation between robots and human beings, the result is a barrier that restricts the use of collaborative control concepts with a human-robot collaboration. Mixed operation in areas used simultaneously by humans and robots is also frequently not possible with mobile robotic units such as those mounted on moving platforms, for example. Concepts with application-adapted kinematics, in which hazardous conditions are prevented by the shape of the robot housing, severely restrict the freedom of design of the kinematics.

As a consequence of these restrictions, known collaborative robotic concepts can be used only in very limited areas of application on account of their characteristics. Therefore, collaborative robot concepts have so far achieved only very little market penetration.

The realization of collaborative concepts is especially challenging in logistics robots, in particular autonomous guided vehicles (industrial trucks) with robot arms for load handling, e.g. mobile order-picking robots, because logistics robots must be able to move freely in a logistics area such as a warehouse building, for example. During these operations they constantly encounter completely new working environments that must be secured.

The great majority of known monitoring systems are based on two-dimensional (2D) monitoring fields, which are generally sensed using 2D laser scanners. Sensor systems for 3-dimensional (3D) monitoring fields generally require a stationary installation for the monitoring of stationary equipment such as arm kinematics, for example.

The prior art is generally based on mechanical security fences or, in a smaller number of application fields, on ground-level 2D monitoring fields, optionally separated into alarm and protection fields, which are defined during machine setup by a human machine setter and must be verified manually.

A disadvantage of the known solutions is in particular the need for the stationary installation of the arm kinematics and the resulting lack of flexibility. The stationary installation of security fences also results in increased labor and maintenance expenses. The costs of known solutions are thereby increased. Moreover, solutions of the prior art take up a lot of space in a warehouse environment, as a result of which the warehouse space cannot be used efficiently.

3D monitoring is used only in very isolated cases. Here, monitoring is realized in accordance with the same philosophy of simple, e.g. convex 3D spaces, that are manually defined, configured and verified. A disadvantage of these solutions of the prior art is the high cost of labor to constantly define, configure and verify the 3D spaces.

SUMMARY OF THE INVENTION

The object of the present invention is to make available an improved solution that addresses at least one of the problems cited above. It is a particular object of the invention to make available a solution that increases safety during operation of the load handling kinematics even in the presence of changing working environments in mixed operation with humans.

The invention teaches that this object is accomplished, according to the first aspect, by a system for securing a load handling environment of load handling kinematics in a changing working environment, wherein the system comprises an environment sensing unit which is designed to acquire data of the load handling environment and an environment monitoring unit that is in operational connection with the environment sensing unit, wherein the environment monitoring unit is configured to evaluate the data so that an open space surrounding a load to be handled, a work space defined by a movement space of the load handling kinematics, a distance space at least partly surrounding the work space and a process space that comprises the work space and the distance space are determined, and wherein the environment monitoring unit is configured to monitor at least the distance space and/or the process space, at least partly.

The invention is based on the knowledge that a working environment, in particular in a logistics department, in particular a warehouse, and therefore also a load handling environment changes constantly, in particular in the case of collaborative concepts employing logistics robots, in particular autonomous guided vehicles (industrial trucks) with robot arms for load handling, such as mobile order-picking robots, for example.

The changing working environments, in particular as a result of free movements of logistics robots in logistics departments such as a warehouse building, for example, can be constantly monitored by the system and thereby secured.

The solution can in particular define an open space and/or a work space and/or a process space and/or a distance space and/or their contours, in particular their outside contours and/or inside contours, as a function of the specific situation, based on the data from the environment sensing unit, in particular ad hoc, in a changing working environment by the interplay of the acquisition of the data of the load handling environment by means of the environment sensing unit and the monitoring of the load handling environment by analyzing the data by means of the environment monitoring unit.

The environment monitoring unit can particularly preferably be designed to continuously check for a change in the load handling environment in the process space and/or the distance space. Any changes can thereby be detected.

In particular, the solution makes it possible to monitor a three-dimensional space, in particular a three-dimensional monitoring space. The purpose of the monitoring can in particular be the detection of an occupation by objects and/or a change of object positions and/or the penetration of objects into this space.

Objects in this case can in particular be understood to mean both persons and things, in particular a load, additional load handling kinematics, additional logistics robots, a shelf system or similar objects.

The three-dimensional monitoring space can in particular be the open space and/or the work space and/or the process space and/or the distance space. The three-dimensional monitoring space can preferably equal the total volume of the open space and/or of the work space and/or of the process space and/or of the distance space. The three-dimensional monitoring space can preferably be a portion of the total volume of the open space and/or of the work space and/or of the process space and/or of the distance space.

As a result of the solution according to the invention, alternative and expanded capabilities of work space monitoring and/or process space monitoring and/or distance space monitoring become possible. The need for a stationary installation of the load handling kinematics is thereby eliminated. A logistics area can thereby be laid out to optimize the space available. The time required for unloading and loading processes can also be optimized.

Moreover, as a result of the monitoring of the three-dimensional load handling environment, appropriate reactions can be taken to unforeseen external influences on the process. A combined operation with a plurality of robots and/or robots and human beings in a constantly changing working environment becomes possible in a simple manner that guarantees a safe process. The solution proposed by the invention also makes possible a significant reduction in personnel costs.

The data on the load handling environment can particularly preferably be generated by the environment sensing unit and transmitted to the environment monitoring unit. Preferably the environment sensing unit can be electronically coupled with the environment monitoring unit, in particular wirelessly or via a wired line.

The environment sensing unit and the environment monitoring unit can preferably be integrated into an environment securing unit. The environment securing unit can in particular be configured so that it can be installed and/or retrofitted on a logistics robot. For this purpose, the environment securing unit and/or the environment monitoring unit can have an interface which is configured so that it can be electronically coupled with a robot control unit and/or a central control unit. In this manner, for example, a reaction signal can be generated and transmitted in response to the monitoring of the distance space and/or the process space, in particular when an entry of an object or a change in a specified position of an object into the distance space and/or process space is detected, to output an acoustic alarm signal, in particular an alarm tone, and/or an optical alarm signal, in particular generated by means of a signal light, and/or to control the logistics robot, in particular to stop or slow down a load handling process and/or a movement of the load handling kinematics and/or the logistics robot. In particular, the load handling environment can continue to be monitored after this movement has been stopped and the exit of the object from the distance space and/or process space and/or the return of the object to the specified position has been determined. In reaction, for example, a release signal can be generated and transmitted, to emit an optical release signal and/or an acoustic release signal, in particular a release tone, and/or to actuate the logistics robot, in particular to restart a load handling process and/or a movement of the load handling kinematics and/or of the logistics robot.

Particularly preferable is the sensing of the load handling environment and/or a definition of the load handling environment and/or of the open space and/or of the work space and/or of the process space and/or of the distance space before the start of a load handling process, so that the sensed open space and/or work space and/or process space and/or distance space can remain defined as unchanged during the load handling process.

Alternatively or additionally, the sensing of the load handling environment and/or the definition of the load handling environment and/or of the open space and/or of the work space and/or of the process space and/or of the distance space can be performed continuously and/or can be repeated and/or adjusted during the load handling process.

An open space can be defined as a three-dimensional space that is not occupied by one or more objects, i.e. one that is free of objects. The open space can in particular be filled exclusively with gas or air, i.e. in particular essentially free of objects. The open space can in particular surround a load. Preferably the open space can change during the handling of a load, in which case the open space can always be the open space surrounding the load. Particularly preferably the open space can be surrounded and/or delimited by a floor and/or the load and/or an object or a plurality of objects.

Particularly preferably, the open space can additionally or alternatively be limited by predetermined dimensions. It thereby becomes possible to sense a reduced open space that describes a volume that is relevant for the load handling process. The pre-determined dimensions can be selected and/or determined, in particular calculated, so that in particular a process-relevant volume is covered, so that the load handling kinematics in a load handling process move within this process-relevant volume, whereby the additional distance space is preferably taken into consideration. The reduced open space can in particular be oriented on the basis of the load handling kinematics and additional distances, in particular load protection distances. Particularly preferably, for example, the height of the open space can be limited.

In particular, the predetermined dimensions can be stored in or programmed into the environment monitoring unit.

The environment monitoring unit can particularly preferably have a user interface or be electronically coupled with a user interface.

The environment monitoring unit can preferably be configured by means of the user interface. For example, the predetermined dimensions can thereby be programmed by a user.

The environment monitoring unit can particularly preferably be configured so that it can be electronically coupled with a control unit, in particular a robot control unit and/or a central control unit. For example, the predetermined dimensions can thereby be programmed by a user. In particular, the load handling kinematics can thereby receive design data and/or order data, on the basis of which predetermined dimensions can be determined.

The quantity of data and data processing time can thereby be reduced.

According to the invention, the open space can be determined by means of the environment monitoring unit, in particular by processing the data on the load handling environment acquired by the environment sensing unit.

The work space of the load handling kinematics can in particular be understood to include the movement space of the load handling kinematics plus the dimensions of a load grabbed or to be grabbed. Particularly preferably, a defined maximum load size can be taken into consideration. Alternatively and/or additionally, the environment sensing unit can be designed to acquire a dimension of a load to be grabbed before the load is picked up so that this variable can be taken into consideration, in particular in the calculation of the work space.

In particular, the work space can also include a load protection space surrounding the load grabbed or to be grabbed. The load protection space can in particular have an outside dimension that is a maximum of $\frac{1}{5}$ or a maximum of $\frac{1}{10}$ or a maximum of $\frac{1}{20}$ or a maximum of $\frac{1}{30}$ larger than the external dimensions of the respective load grabbed or to be grabbed. It can thereby be guaranteed that a load will still be inside the work space, even in the event of slippage during the load handling process. The load protection space can in particular be pre-defined and stored in or programmed into the environment monitoring unit.

Particularly preferably, the dimensions of the load and/or of the load and/or of the load protection space can be input via a user interface. Preferably, the dimension of the load can be determined by means of the environment sensing unit.

The load protection space can preferably be added by means of the environment monitoring unit.

The movement space of the load handling kinematics can particularly preferably be determined by receiving movement data. The movement data can preferably be transmitted by a user inputting the data via a user interface and/or by the load handling kinematics itself, preferably by its control system, and transmitted to the environment monitoring unit.

A distance space can be understood in particular as a space that at least partly surrounds the work space, preferably in the manner of a shell or envelope. In particular, the distance space can be generated by a distance from the work space required for the representation of a safe work process. Preferably, application-related distances can be included in the formation of this distance space to guarantee a work process free of interruptions and/or free of collisions.

The environment monitoring unit can preferably be configured to determine the necessary distance from the work area as a function of a user input and/or as a function of a central control signal and/or as a function of parameters of the load handling kinematics, in particular dimensions of the load handling kinematics and/or working speeds, in particular changing working speeds. The environment monitoring unit can in particular have an interface, via which a signal or signals that carry information concerning the parameters can be transmitted, in particular received.

A process space can preferably be understood to mean the work space plus the distance space. The process space can therefore in particular comprise both a space required for the load handling process and the movement of the load handling kinematics, as well as an additional space to guarantee a lack of interruptions and/or a lack of collisions.

The process space and/or the distance space can preferably be monitored and continuously updated at least partly during an overall load handling process.

Environment sensing and/or sensing of the work space and/or of the distance space and/or of the process space and/or of the open space can in particular mean the acquisition of information on the handling environment of the mobile robot by the environment sensing unit, preferably by means of optical sensors such as cameras, for example, depth-sensing cameras, 2D/3D laser scanners or other suitable sensors such as radar sensors or ultrasound sensors, for example. The sensing can be performed in particular during the movement past the load handling position and/or before the approach and/or during the approach and/or after the approach to the load handling position. It can in particular also be performed by other vehicles or stationary sensors and transmitted by means of communications units.

The environment sensing unit and/or the environment monitoring unit can particularly preferably be configured to receive additional data on the load handling environment from an external data source, in particular a cloud, and/or to send data it itself has acquired to an external data source, in particular a cloud. The system can in particular include the cloud. Consequently, for example, it is possible to have a plurality of environment sensing units which can be installed in a stationary manner, in particular located in the logistics environment, or can be mobile, in particular on a logistics robot, or configured so that they can be located in a stationary manner, in particular in the logistics environment, or can be mobile, in particular on a logistics robot.

Particularly preferably, the environment sensing unit can be configured to continuously acquire data from the changing load handling environment, in particular before and/or during and/or after a load handling process. Preferably, the environment monitoring unit can be configured to monitor the changing load handling environment continuously by analyzing the data. The adaptive three-dimensional load handling environment can thereby be monitored during the entire load handling process.

The acquisition of data of the load handling environment can preferably include a recording of the load handling environment and/or a generation of data that contains information about the load handling environment.

In a first preferred embodiment of the invention, the system is designed to be associated with a logistics robot, in particular a mobile robotic vehicle, in particular an autonomous guided vehicle (industrial truck) with at least one set of autonomous load handling kinematics, in particular a robot arm. A control unit of the logistics robot can in particular be configured to control the load handling kinematics. According to the preferred embodiment, the environment can be sensed and the trajectory of the load handling kinematics can be plotted as part of the process.

In an additional embodiment of the invention, the system is designed to be associated with load handling kinematics that are configured to be located on an autonomous or manually guided vehicle (industrial truck).

In an additional advantageous configuration, the system is designed to be associated with load handling kinematics that are designed to be located on a positioning unit so that they can be positioned by means of the positioning unit, in particular a positioning rail, in changing working environments. The positioning rail can be linear, for example, and/or can include non-linear segments, in particular curves.

In one preferred configuration, the system is designed to be associated with stationary load handling kinematics. Preferably, the system of stationary load handling kinematics is installed in a changing environment. In this case, both the load source, preferably a source pallet, as well as the load destination, preferably a target pallet, are mobile.

The system can particularly preferably include a logistics robot of this type and/or an autonomous or manually guided vehicle (industrial truck) and/or a positioning unit of this type and/or a fixing unit for stationary fixing. Accordingly, the system can include the load handling kinematics that are located on the logistics robot and/or the autonomous or manually guided industrial truck and/or the positioning unit and/or on the fixing unit.

In particular, the system, preferably the environment monitoring unit and/or environment detection unit, can be designed to be arranged on the logistics robot and/or the autonomous or manual industrial truck and/or the travel unit and/or on the fixation unit and in particular to enable and/or have a signaling coupling with a corresponding control unit.

A control unit can particularly preferably be configured to control the load handling kinematics. The control unit can preferably be electronically connected with the environment monitoring unit, in particular wirelessly or via a wired line, and can be configured to plan the trajectory of the load handling kinematics and/or to control the load handling kinematics as a function of the environment monitoring. The environment monitoring unit can particularly preferably be integrated into the control unit and/or can be configured so that it can be integrated into the control unit.

For example, the environment monitoring unit can preferably be configured to detect a change in the distance space and/or in the process space, in particular independently of the load handling kinematics, to generate a signal, and to transmit the signal to the control unit. The control unit can in particular be configured to receive the signal and to control the load handling kinematics as a function of the signal and/or to slow down a movement and/or in particular to stop an operation. The control unit can particularly preferably be electronically coupled with a user interface to transmit a signal, in particular an acoustic or optical signal, to the user. The user interface can in particular be located on a central monitoring unit. The central monitoring unit can preferably be coupled with a plurality of load handling kinematics and/or systems to be secured.

The environment monitoring unit can particularly preferably be configured to sense a process space becoming open, in particular a distance space becoming open, to generate a second signal and to transmit the second signal to the control unit. The control unit can in particular be configured to receive the second signal and to control the load handling kinematics as a function of the second signal and/or to accelerate a movement and/or in particular to stop operation and/or to start operation. The control unit can particularly preferably be electronically coupled with a user interface to transmit a signal, in particular an acoustic or optical signal, to the user. The user interface can in particular be located on a central monitoring unit. The central monitoring unit can preferably be coupled with a plurality of load handling kinematics and/or systems to be secured.

The monitoring can be performed in particular on the basis of a separation into the process space and the work space located in it.

In particular, accordingly multiple definitions and/or adjustments of the open space and/or of the work space and/or the process space and/or the distance space can be provided, preferably if changes in the environment are detected, in particular sensed, and/or additional information is generated on the basis of the recording of the load (e.g. a different load weight, a modified grab position, an unplanned change of the load, such as damage to the load, for example).

The environment sensing unit and/or the environment monitoring unit can particularly preferably be configured so that data from various sources, preferably the environment sensing unit, the load handling kinematics control unit, additional sensors of the load handling kinematics, including the grabber system (preferably force/pressure sensors, optical sensors, distance and contour-measuring sensors, acceleration sensors) can be received and analyzed.

As explained above, the load handling kinematics can in particular be installed on a logistics robot. In that case, the logistics robot can preferably first approach a position specified for the load handling.

The system can preferably be configured to carry out the following steps in sequence, in particular before or after the approach. Individual steps or some or all of the steps can preferably be carried out in a repeating or variable sequence:

sensing of the load handling environment by means of the environment sensing unit, preferably by means of optical sensors such as, for example, cameras, depth-sensing cameras, 2D/3D laser scanners as well as other suitable sensors such as, for example, radar sensors or ultrasound sensors. The sensing of the load handling environment can preferably be performed during the approach to a load handling position and/or during travel past a load handling position, when the system is at a stop or from information that has been determined by other vehicles and/or stationary sensors.

precise positioning of the vehicle, if necessary, on the basis of the environment sensor information.

definition of the available open space and division into work space and process space.

performance of the load handling process within the work space.

monitoring of the process space throughout the load handling process.

After the completion of the load handling process, the vehicle control is preferably handed back over to a vehicle navigation control system.

According to one particularly preferred embodiment of the invention, the environment monitoring unit comprises an electronic computer unit in which a computer program is stored that contains an algorithm that is configured to perform a calculation of the open space and/or of the work space and/or of the distance space and/or of the process space.

In particular, the calculation can be performed by the expansion of points in space sensed to be open, starting from a point in space selected from the points in space sensed to be open, in particular a point in space in the immediate vicinity of an action point, in particular a load grab point of the load handling process, up to a detected boundary object of a specified stopping limit.

By expanding this point in space in all spatial directions, in particular by a spherical expansion, the space can preferably be expanded until:

1. a boundary object is detected, and/or
2. a defined boundary limit, e.g. a specified edge contour, is reached.

The expansion can particularly preferably be performed starting from a plurality of selected, spatially distributed points.

The expansion can preferably be parallelized. The process can thereby be accelerated in particular by a simultaneous expansion starting from different points as starting points with the use of parallelizable computer systems, preferably multi-processor systems or GPU systems.

The algorithm is preferably designed to model an enclosing surface contour of the open space and/or of the work space and/or of the distance space and/or of the process space. Preferably the determined open space and/or work space and/or process space and/or distance space can thereby be described by an enclosing surface contour consisting of suitable modeling means. For example, techniques from 3D surface modeling such as, for example, splines, mesh structures (similar to an STL data format) or functional descriptions can be considered for this purpose.

By means of the modeling of the enclosing surface contour, in particular the open space and/or the work space and/or process space and/or distance space can be modeled and/or calculated and/or determined.

An enclosing surface contour can particularly be understood as a boundary area of the open space and/or of the work space and/or of the distance space and/or of the process space and an external space surrounding it.

The algorithm is preferably designed to perform a reduction of the open space and/or of the work space and/or of the distance space and/or of the process space to a convex surface contour.

Preferably, non-convex areas outside the convex surface contour can be eliminated. It thereby becomes possible to define sub-spaces that can be easily sensed.

A convex surface contour can be understood in particular as a surface structure in which all of the connecting lines between any two points on the surface contour extend exclusively through an interior area surrounded by the surface contour.

Analogously, in particular a non-convex surface contour, preferably a concave surface contour, i.e. in particular a surface contour, can be understood as one in which connecting lines between any two points on the surface contour extend at least partly through an exterior area, i.e. through an area outside the interior area surrounded by the surface contour.

The algorithm is preferably designed to model a total space by a combination of sub-spaces of the open space and/or of the work space and/or of the distance space and/or of the process space.

The sub-spaces can in particular be selected so that they have contours that are not very complex and/or can be accurately described. The contours can in particular correspond to simple geometric shapes, such as, for example, a rectangular solid, a cube and/or a sphere. The environment monitoring unit can particularly preferably be configured so that the sensed load handling environment is divided into at least two or preferably a plurality of sub-spaces. All the sub-spaces of the load handling environment, in particular without undercuts or indentations, can thereby be sensed and the environment secured.

The algorithm is preferably designed to model a non-convex total space by a combination of at least two convex sub-spaces of the open space and/or of the work space and/or of the distance space and/or of the process space.

The adaptive open space and/or the work space and/or process space and/or distance space can in particular—depending on the environment contour present—be non-convex, e.g. if there are peripheral structures that project into the space. This generally complicates the surface modeling, and at the same time these irregular peripheral areas potentially do not represent usable work areas. The configuration proposed here provides for the reduction of the monitored space to the convex surface contour that can be described in the simplest possible manner.

In one development, the algorithm comprises a modeling of non-convex spaces by the combination of convex spaces. In this manner, the non-enclosed areas can also be described by their own convex surfaces. Non-convex spaces can be modeled by the combination of convex spaces so that more complex geometries can be enclosed. The modeled space represents the entire work area, including the monitored area. The modeled space can preferably be further modified.

According to another advantageous configuration, the algorithm is configured to perform a calculation of the process space by the addition of the work space and of the distance space.

Preferably the work space and/or the distance space can be sensed by means of the environment sensing unit.

Data that describe the work space can particularly preferably be received via a corresponding interface. These data can in particular be programmed in by a user or retrieved by a control unit of the load handling kinematics.

Data that describe the distance space can particularly preferably be received via a corresponding interface. These data can in particular be programmed in by a user or retrieved by a control unit of the load handling kinematics.

The algorithm can particularly preferably be configured to perform a calculation of the distance space by eliminating the work space from the process space.

The algorithm can be particularly preferably be configured to monitor an entire volume of the process space and/or of the distance space.

The algorithm can particularly preferably be configured to determine an external contour and/or an internal contour of the distance space, wherein the algorithm is configured to monitor at least the external contour and/or the internal contour of the distance space.

One disadvantage of the overall monitoring of the entire process space and/or of the work space is that the load handling kinematics, including the gripper and the load, are located inside the work space and move during a load handling process, so that a changing environment can thereby be sensed. This work space is therefore not empty, because it is occupied, for example, by the arm kinematics of the load handling kinematics and also changes over time, because the load handling kinematics travel through this space during their work process, which interferes with a simple monitoring.

Therefore, the advantageous configuration provides for the formation of the distance space in which the work space of the load handling kinematics (i.e. the entire volume through which the load handling kinematics, the gripper and the load travel during the process) is eliminated from the process space and/or can be disregarded during the monitoring.

The environment monitoring unit can particularly preferably be configured to monitor both the work space as well as the process space and to receive data relating to the load handling kinematics, in particular with regard to the trajectory, and or the load and to perform calculations based on the data. The changing load handling environment can therefore also occur inside the work space.

The system can particularly preferably comprise a living being recognition system that is designed to detect and recognize living beings. The environment sensing unit can particularly preferably comprise the living being recognition system or be configured as one. The system can thereby distinguish in particular between an operator and the load handling kinematics and, for example, can monitor the entire process space, in particular also including the work space, during a load handling process. The system can in particular be configured so that only the entry into and/or exit of living beings from the process space and/or distance space and/or work space is monitored.

Particularly preferably, the living being detection system can issue a safety release for the logistics robot if the absence of living beings in the process space and/or the work space and/or the distance space is determined, i.e. in particular no living objects are detected and recognized.

The living being recognition system can particularly preferably comprise a sensor system that is designed to detect and recognize living objects. The sensor system can in particular be in an operative connection with the environment sensing unit and/or the environment monitoring unit and can in particular be set to issue a safety release for the logistics robot if no living beings are detected and recognized in the process space and/or work space and/or distance space. The living being recognition system can preferably comprise a radar system that is configured to continuously emit a frequency-modulated radar signal and to receive reflected radar signals, and by analysis of frequency profiles of the received radar signals, can distinguish between stationary and moving objects and recognize living objects by analysis of the movements of the objects.

In particular the living beings detection system can comprise a sensor system that is configured to detect micromovements of objects that originate in particular from respiratory movements and/or pulse movements of the living objects.

For the entire distance space, the requirement can preferably be that in an overall load handling process no objects may penetrate into this space, and/or no objects located in the space may change, as a particular result of which there is a static space that can be monitored.

In one development, the algorithm is configured to perform a calculation of a trajectory of the load handling kinematics that is optimized in terms of utilization of space and/or as a function of the trajectory optimized in terms of utilization of space to reduce the process space, in particular the distance space, to a minimum process-relevant volume to be monitored, in particular as a function of the trajectory of the load handling kinematics optimized in terms of utilization of space.

The process space described above can optionally comprise areas that are larger than necessary with regard to the distances conventionally used for a particular application, preferably because as a result of the use of movement data of the load handling kinematics (e.g. speeds of travel), in particular of the logistics robot, it becomes possible to reduce the distance, in particular the load distance. This development of the invention therefore preferably reduces this space to the extent that the result is a minimum volume to be monitored adjacent to the work space of the kinematics. This approach increases the robustness of the system, because the smallest possible work space and/or distance space is defined and thus the likelihood of a violation of these spaces is reduced.

This variant embodiment is based on the teaching that the speed of travel of the load handling kinematics is reduced in particular as they approach the load pickup position and/or the load delivery position. The speed of travel between the load pickup position and the load delivery position can be significantly higher. At elevated speeds of travel, it may be necessary in particular to increase the distance space to be able to decelerate the load handling kinematics promptly in the event of the penetration of an object into the distance space and/or a detected change in the distance space, so that the load handling kinematics can come to a stop before reaching the area into which the object has penetrated and/or in which the change was detected. As a result of this configuration, the utilization of space can be optimized and at the same time interruptions in operations and/or collisions can be prevented.

The system can be configured in particular to receive data from a kinematics motion planning unit of the load handling kinematics and use it for the calculation of the necessary distance space.

The system can particularly preferably be configured to transmit data on the available and sensed open space and/or process space and/or work space and/or distance space as a restriction command to the control unit of the load handling kinematics, to effect a restriction of the motion planning. In this manner, the system can preferably be configured to modify the trajectory of the load handling kinematics.

The system can preferably be configured to the extent that the trajectory (path of motion) of the load handling kinematics, including the gripper and load, is modified for optimum use of the available space. The goal of the optimization can thereby be the achievement of the shortest possible process time for the load handling process.

The realization of the process can preferably be accomplished by means of technologies for the control of handling kinematics, preferably robot arm movement controls, that can execute a specified trajectory as precisely as possible (in particular the "departure" portion).

A monitoring unit can preferably be used for this purpose that can sense the position of the load handling kinematics with reference to the sensor data of the load handling kinematics, and can compare these values as measured values with the specified setpoint values. This technology can be used with self-monitoring to make handling kinematics, preferably robot arms, inherently safer.

Movement data from the kinematics control system can preferably be used as input data for the monitoring, preferably so that the movement of the load handling kinematics, in particular including the gripper and/or load, are projected into the sensed environment data and taken into consideration in the framework of the monitoring. In this context, this data can in particular represent an "expected and allowed change" inside the work space.

Additional configurations are, for example, a movement of the load handling kinematics that provides optimum protection for the load. Because the trajectory (including dynamic parameters such as speed of travel, drive forces (torques) and object accelerations) and the work space and/or process space can in particular influence one another, an iterative approach can serve as the basis for these configurations, in which given optimization criteria are optimized by the adaptation of the trajectory, work space and/or distance space.

The environment monitoring unit can preferably comprise at least one separate unit.

In an additional preferred embodiment, the environment monitoring unit can comprise at least one unit that is integrated into a control unit.

The distance space and/or the process space can preferably be monitored by means of the separate unit and/or the control unit. The monitoring can particularly preferably be performed by the control unit and in parallel by the separate unit and/or a plurality of separate units.

The separate unit and/or the plurality of separate units and/or the control unit can particularly preferably be located on the load kinematics and/or the logistics robot and/or on the vehicle or can be installed in a distributed fashion.

In one advantageous configuration, the environment sensing unit is in the form of an optical sensor, in particular a camera and/or a depth-sensing camera and/or a 2D laser scanner and/or a 3D laser scanner, and/or an alternative sensor system, in particular a radar sensor.

The environment sensing unit can preferably comprise an optical sensor, in particular a camera and/or a depth-sensing camera and/or a 2D laser scanner and/or a 3D laser scanner, and/or an alternative sensor system, in particular a radar sensor, and/or an ultrasound sensor.

The environment sensing unit can in particular be electronically coupled, in particular wirelessly, with a central monitoring device, and be configured to receive signals from the central monitoring device that carry the data of the load handling environment.

According to one development of the invention, the environment monitoring unit can be in an operative connection with an external supplemental sensor system, in which case the environment sensing unit and/or the environment monitoring unit can be configured to receive data from the external supplemental sensor system. The environment monitoring unit and/or the environment sensing unit is/are preferably configured to merge the data from the external supplemental sensor system with the data from the environment sensing unit.

For example, the spatial monitoring can be expanded by two additional sensors, such as, for example, 2D scanners to monitor areas near the floor. The supplementary sensor system, in particular the additional sensors, can particularly preferably be located in a warehouse environment, in particular on a ceiling or on shelf elements, and/or on additional logistics robots and/or other vehicles.

Subspaces can particularly preferably be created out of the monitoring space which, in particular as described herein, can be formed by the work space and/or process space and/or distance space. These subspaces can preferably be partial spaces with the same dimension (preferably if the sensors used have a relatively small sensing area) or spaces with a small dimension (preferably if a 2D surface scanner is used).

In the case of the above mentioned 2D scanner referenced by way of example, the formation of these subspaces can preferably be achieved by sectioning at the scanner height through the monitoring space, so that a 2D contour, i.e. a 2D space, results, and/or the resulting section surfaces span the space that can be monitored by the additional sensor system.

The subspace generated can preferably be monitored by the additional sensor system, and the system can in particular merge the partial results of the individual monitorings into an overall result.

An advantageous variant of the invention provides that the environment monitoring unit is configured to form the process space in the area of stacked individual goods, in particular a process space at least partially, preferably completely, surrounding stacked individual goods, by evaluating the data.

This variant can relate in particular to load handling situations in which individual goods stacked with the load handling kinematics, preferably on cargo carriers such as pallets, for example, are to be transported to a destination point, such as an autonomous load deck, for example. For this purpose, in particular first the open space surrounding the individual load stack, including the pallet, is determined up to adjacent structures, for example a shelf structure and a floor, at a load pickup point.

Adjacent spaces, such as for example the space surrounding a neighboring individual load stack, can in particular also be recognized by the system as open space, because this space can optionally be used as movement space for the load handling kinematics.

In particular the open space around a load delivery point can be determined in the same manner. Because here in particular, in some cases there may not be any surrounding structures, in this case the relevant open space can be bounded by parametrizable limits that can be determined on the basis of the technically possible movement space of the load handling kinematics.

The work spaces for the load pickup on the stack of individual goods, and for load deposition on the autonomous load deck, can preferably be connected by a third work space that can span the surface in front of the pallet and the load deck.

In contrast to the work spaces for load pickup and load deposition, the connecting third work space can be characterized by the following properties:

in particular it can be modified by a change in the position of the vehicles and therefore offer additional degrees of freedom, in particular can generally consist of open space and thus cannot be recognized as an allocated work space, in particular by outsiders, and in particular can generally be sensed by the vehicle sensing system (e.g. 2D scanners)

Preferably the system provides, by suitable means, the ability to:

this work space can be modified, in particular by repositioning the vehicle as necessary so that a more efficient solution to the loading problem can be found, in particular the allocated work space can be marked by
    suitable means, for example with projection means, that
    project corresponding boundaries on the floor, and
in particular the work space can be monitored with
    additional means of the vehicle sensor system.

The process described above can be carried out in particular in the form of a load pickup, in which load handling kinematics, preferably attached to a vehicle, transport stacked individual goods, preferably on load carriers such as a pallet, for example, to a destination point such as an autonomous load deck, for example. Alternatively the process described above can be modified, in particular by inversion into a load deposition, in which load handling kinematics, preferably attached to a vehicle, transport an individual item that is on the autonomous load deck to a destination load carrier such as a pallet, for example.

The environment monitoring unit is particularly preferably configured to form, in the vicinity of stacked individual goods, in particular a process space that at least partly and preferably completely surrounds stacked individual goods, and load handling auxiliary equipment, in particular shelf elements.

This variant is characterized in particular in that it:
preferably executes the handling of individual goods (e.g. crates or boxes) in connection with load handling auxiliary equipment such as shelves, for example,
the load handling auxiliary equipment can preferably be realized as an area, in particular as a surface, and preferably as flat surfaces (e.g. flat staging carriers), or with structures (e.g. shelves) constructed on it,
the load handling auxiliary equipment can preferably have surrounding structures, and
the load handling auxiliary equipment can preferably be partly loaded with individual goods that can be moved.

In this variant, the system can in particular be configured to determine the work spaces for the pickup and deposition of loads as well as the connecting work space.

The work space for the load pickup and the connecting work space can in particular be determined analogous to one of the variants described above. The determination of the work space for the load delivery can differ with regard to the determination such that here, the surrounding structure does not consist of "closed surfaces", but for example only shelf struts of the load handling auxiliary device. The system can in particular be configured in this case to recognize that the open space between the shelf struts cannot be used as work space, or can be used only to a limited extent, and can preferably exclude this area. In an expanded variant, the system can in particular also include this outlying work area, and prevent collisions with the delimiting structures such as the shelf struts, for example, by corresponding modifications in the movement planning.

The process described above can be carried out in particular in the form of a load deposition, in which load handling kinematics preferably attached to a vehicle, for example, transport an individual item on a load carrier such as a pallet, for example, to the load handling auxiliary device and deposit it there. Alternatively the process described above can be modified, in particular by inversion into a load pickup, in which load handling kinematics, preferably attached to a vehicle, transport an individual item that is in the load handling auxiliary device, to a destination load carrier such as a pallet, for example.

In particular, the environment monitoring unit is preferably designed to form a process space that at least partly, preferably completely, surrounds the stacked individual items, and work equipment, in particular work benches, in the area of stacked individual items.

The variants described above take into consideration in particular the autonomous handling of loads in interaction with load carriers such as pallets, for example, and auxiliary load handling equipment such as shelves, for example. The variant described here in particular expands the system so that it is configured to take into consideration and sense tools and equipment such as workbenches, for example.

In addition to the situations considered above, here in particular there is an irregular work space and a distance space that is separated by indentations or recesses, for example by a space beneath a tabletop.

The load handling process can in particular proceed analogous to the process according to the variant described above, because here a load movement takes place from one area to another area, in particular from one flat surface to another flat surface. The result of the determination of the work space and/or of the distance space can differ, since the area around the tabletop in particular must be recessed to prevent a collision of the load handling kinematics and/or of the load and/or of the logistics robot.

An additional aspect of the invention is a logistics robot with load handling kinematics comprising a system as described above.

An additional aspect of the invention is a method to secure a load handling environment of load handling kinematics in a changing work environment, in particular by means of a system and/or logistics robot as described above, comprising the following steps:
acquisition of data from the load handling environment, in particular by means of an environment sensing unit,
evaluation of the data, in particular by means of an environment monitoring unit in an operative connection with the environment scanning unit, comprising:
determination of an open space surrounding a load to be handled,
determination of a work space defined by a movement space of the load handling kinematics,
determination of a distance space that at least partly surrounds the work space,
determination of a process space that comprises the work space and the distance space, and
at least the partial monitoring of at least the distance space and/or of the process space, in particular by means of the environment monitoring unit.

The method particularly preferably comprises the calculation of the open space and/or of the work space and/or of the distance space and/or of the process space, in particular by expansion of points in space detected as open, beginning from a point in space selected from the points in space recognized as open, in particular a point in space in the immediate vicinity of an action point, in particular a load engagement point of the load handling kinematics, up to a detected, delimiting object or a predetermined termination limit, whereby preferably the calculation is performed by the execution of an algorithm that is in particular contained in a computer program that is in particular stored in an electronic calculator unit of the environmental monitoring unit.

In particular, the method can further comprise the step, as a function of a detected object and/or a detected change inside the process space and/or the work space and/or the distance space, of issuing a reaction command to control an appropriate reaction of the load handling kinematics and/or of the logistics robot. In particular an acoustical alarm signal, in particular an alarm tone, an optical alarm signal, can be provided to effect a deceleration of the load handling process, in particular a deceleration of the movement of the load handling kinematics and/or a deceleration of the movement of the logistics robot, and/or a stop.

Preferably a replotting reaction can be provided, with which the trajectory can be adjusted so that there is once again an "unviolated" process space.

Particularly preferably, available data from sensing units external to the system, in particular sensor sources, can be polled and received. For example, this data can originate from additional autonomous guided vehicles (industrial trucks) and/or global data sources, in particular cloud systems. The hereby expanded environmental data can in particular be integrated into the environment sensing by this unit and used together with it in the steps of the method described above.

According to one advantageous configuration, the method comprises the step: modeling of an enclosing surface contour of the open space and/or of the work space and/or of the distance space and/or of the process space, in particular by executing the algorithm.

According to one advantageous configuration, the method comprises the step: reduction of the open space and/or of the work space and/or of the distance space and/or of the process space on a convex surface contour, in particular by executing the algorithm.

According to one advantageous configuration, the method comprises the step: modeling of an overall space by combining the subspaces of the open space and/or of the work space and/or of the distance space and/or of the process space, in particular modeling of a non-convex overall space by combining at least two convex subspaces of the open space and/or of the work space and/or of the distance space and/or of the process space, in particular by executing the algorithm.

According to one advantageous configuration, the method comprises the step: calculation of the process space by addition of the work space and the distance space, in particular by executing the algorithm.

According to one advantageous configuration, the method comprises the step: calculation of the distance space by elimination of the work space from the process space, in particular by executing the algorithm.

According to one advantageous configuration, the method comprises the step: monitoring an overall volume of the process space and/or of the distance space, in particular by executing the algorithm.

According to one advantageous configuration, the method comprises the step: determination of an external contour and/or an internal contour of the distance space and monitoring at least of the external contour and/or of the internal contour of the distance space, in particular by executing the algorithm.

In an additional configuration, the method comprises the step: calculation of a path of movement optimized in terms of utilization of space of the load handling kinematics and/or reduction of the process space, in particular of the distance space, as a function of the trajectory optimized in terms of utilization of space to a minimum process-relevant space to be monitored, in particular by executing the algorithm.

In particular, the method can be developed as follows:
comprising the step of positioning the load handling kinematics, in particular an approach of a logistics robot, comprising the load handling kinematics,
wherein preferably the sensing of the load handling environment takes place during the positioning and/or the approach and/or after the positioning and/or after the approach, and/or comprising the step of a precise positioning of the load handling kinematics and/or of the logistics robot as a function of the environment information acquired, and/or comprising the step of handing control of the load handling kinematics and/or of the logistics robot back to a navigation control system or an additional control system after the completion of a load handling process.

An additional aspect can in particular be a computer program.

In the computer program, the object of the invention is accomplished in that the computer program contains an algorithm with which the method can be carried out. This computer program can be installed in particular in the environment monitoring unit.

An additional aspect can be a computer-readable medium, comprising the computer program with an algorithm to carry out the method.

For additional advantages, variant embodiments and embodiment details of these additional aspects and their potential developments, reference is made to the above description of the corresponding features and developments.

The advantages and improvements achieved with the invention are described below.

The following advantages result in particular:
opening up of work fields without fixed separations between areas to be secured,
handling of goods in "non-open" areas (e.g. load handling auxiliary equipment), and
stationary shelves (not anchored to the floor),
mobile staging systems such as sequential positioning cars, and
movable shelves (rolling shelves).
increase in the working speed, because the logistics robots can be moved with "non-collaborative" speed.
handling of increased payloads, because in particular no permanent force/torque monitoring of the robot is necessary and therefore
heavier payloads and/or
payloads can be moved at increased speeds that can be above the monitoring limits,
reduction of costs for the environment sensing unit, in particular the sensor system, because collision monitoring by sensors mounted on the robot is not necessary,
reduction of costs for the load handling kinematics, because standard industrial robots can be used in place of expensive collaborative robots.

An additional advantage, in particular in the event of the expansion to 3D monitoring spaces, is that:
picking processes in more complex geometries can be monitored,
picking processes in partly occupied geometries and structures (e.g. partly filled shelves) can be monitored.
picking processes in structures that do not have a clear view of the floor can be monitored.
the geometry of the monitoring space can be adapted to the individual situation,
convex 3D monitoring field spaces can be monitored,
overhanging structures that represent concave indentations in the 3D monitoring space can be monitored,
more complex monitoring field geometries consisting of a random number of convex individual spaces can be monitored,
the control of the load handling kinematics is optimized with regard to the parameters that can be selected on the basis of the existing work space, and/or a further optimization by changing the position of the vehicle is achieved, wherein the system, in addition to the load handling kinematics (e.g. robot arm) also uses the traction drive of the vehicle as a degree of freedom for the optimization.

In particular, the invention can be suitable for both loading and unloading processes.

Additional combinations are also conceivable, e.g. the transfer of individual loaded goods from pallets to shelves without necessarily involving a vehicle.

In particular, it is also conceivable for the load handling kinematics to be part of a transport vehicle.

BRIEF DESCRIPTION OF THE DRAWINGS

The terms Fig., Figs., Figure, and Figures are used interchangeably in the specification to refer to the corresponding figures in the drawings.

Additional advantages and details of the invention are described in greater detail below with reference to the exemplary embodiments illustrated in the accompanying schematic figures, in which.

DESCRIPTION OF THE INVENTION

Figure 1:
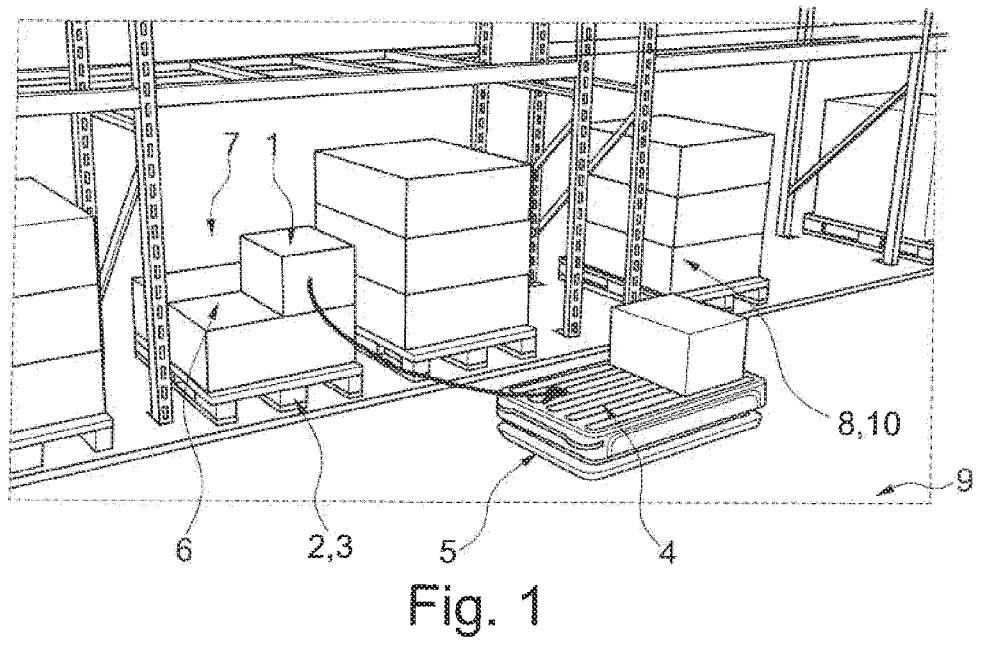
FIG. 1 shows a load handling situation with stacked individual goods.

FIG. 1 shows a load handling situation with stacked individual goods 1. In this situation, the individual items 1 stacked in an individual load stack 6 on load carriers 2, in particular on pallets 2, are to be moved to a load platform 4 of an autonomous guided vehicle 5. In FIG. 1, the load handling kinematics required to move the load, preferably robotic arm kinematics, which are preferably located on a vehicle, are not shown. The load handling kinematics, which are preferably attached to the vehicle, pick up the load, during which the individual item 1 is transported from the load carrier 2, such as a pallet, for example, to the load platform 4 where it is deposited.

The system for securing the load handling environment, by means of an environment sensing unit not illustrated in any further detail, in particular a sensor system, identifies the open space 7 surrounding the individual load stack 6, including the pallet 3, at the load pickup position and extending to adjacent structures, which in this case are formed by shelf elements 8 of a shelf structure 10 and the floor 9.

The system, in particular the environment sensing unit and/or the environment monitoring unit, can in particular be located on the load handling kinematics or on the vehicle. A position, in particular of the environment sensing unit, can be selected so that the load handling environment can be sensed.

Figure 2:
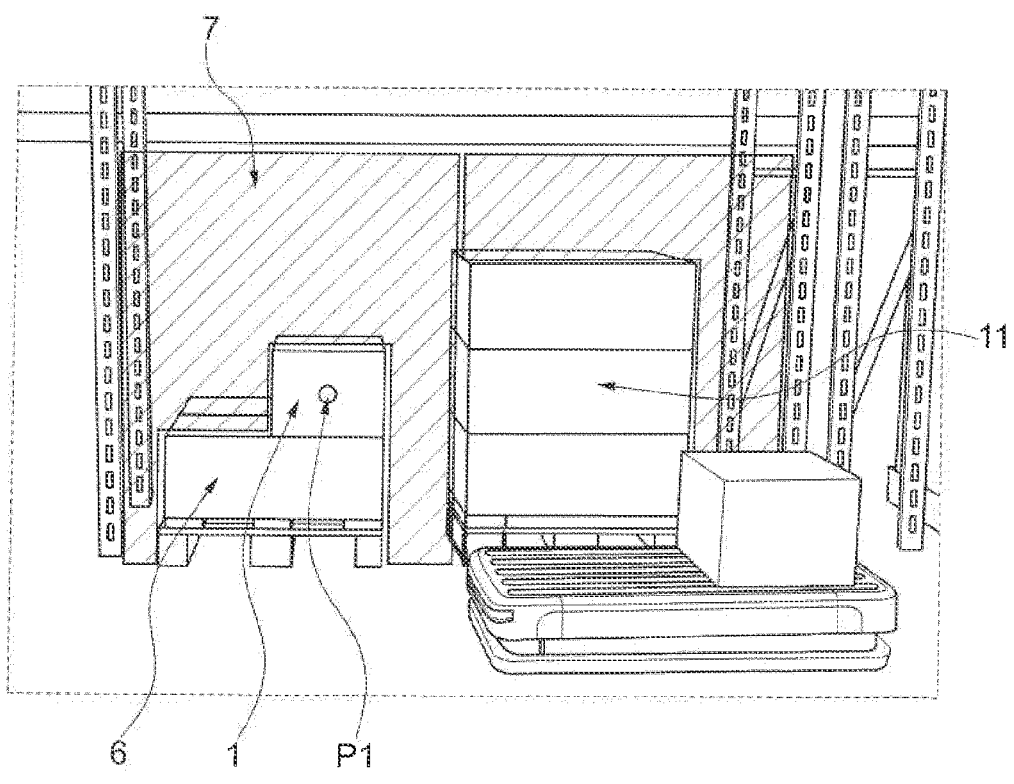
FIG. 2 is a cross sectional area of the open space in a load pickup position illustrated in FIG. 1.

For this purpose, FIG. 2 shows the cross sectional area of the open space 7 surrounding the individual item to be picked up in the load pickup position which extends depthwise and hereby assumes the narrowest possible contour adjacent to the individual load stack 6. In FIG. 2, the action point P1 marks the load pickup position of the individual item 1 to be picked up. Spaces adjacent to the individual load stack 6, for example the space surrounding the neighboring individual load stack 11, are also identified by the system as open space 7, because these spaces can optionally be used as movement space for the load handling kinematics not shown in FIG. 2.

Figure 3:
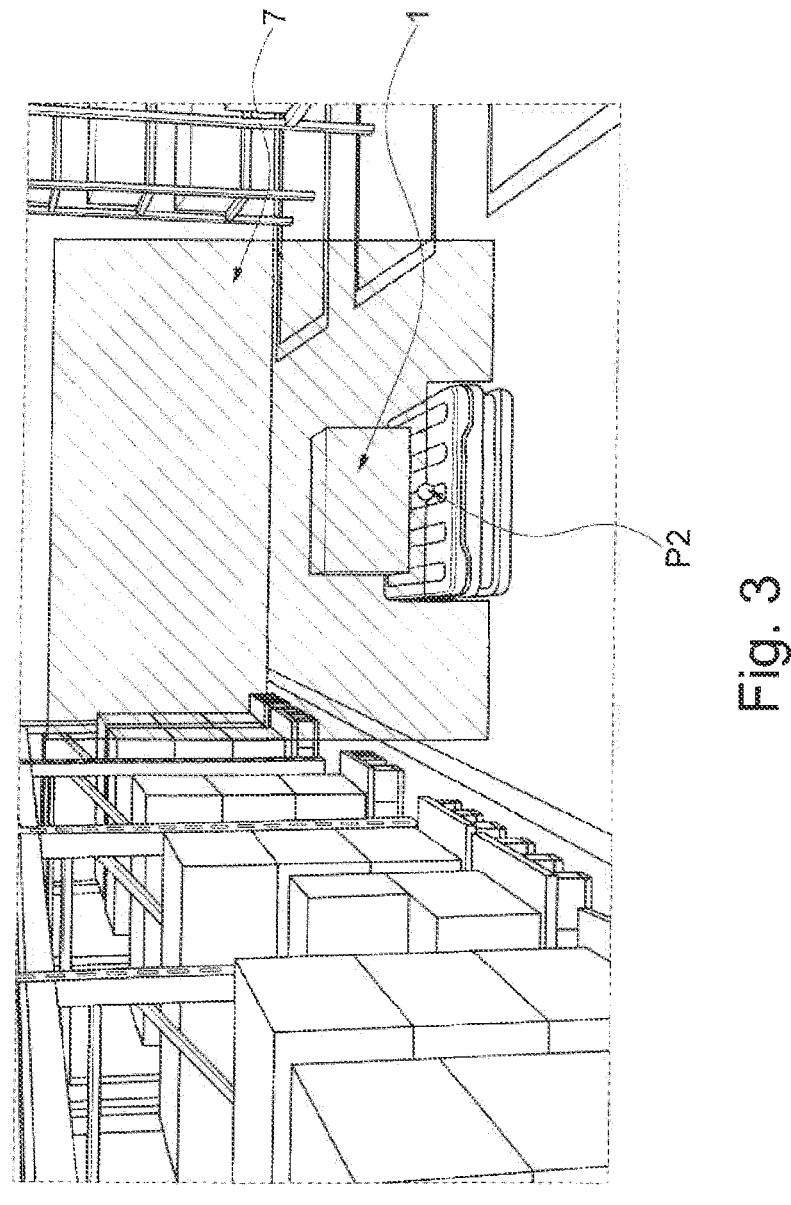
FIG. 3 is a cross sectional area of the open space in a load deposition position illustrated in FIG. 1.

The open space 7 around the action point P2 marked in FIG. 3, which represents the load deposition position of the individual item 1, is determined in the same manner. Because here there are no surrounding structures, in this case the relevant open space 7 can be bounded by parametrizable limits that can result from the technically possible movement space of the load handling kinematics.

Figure 4:
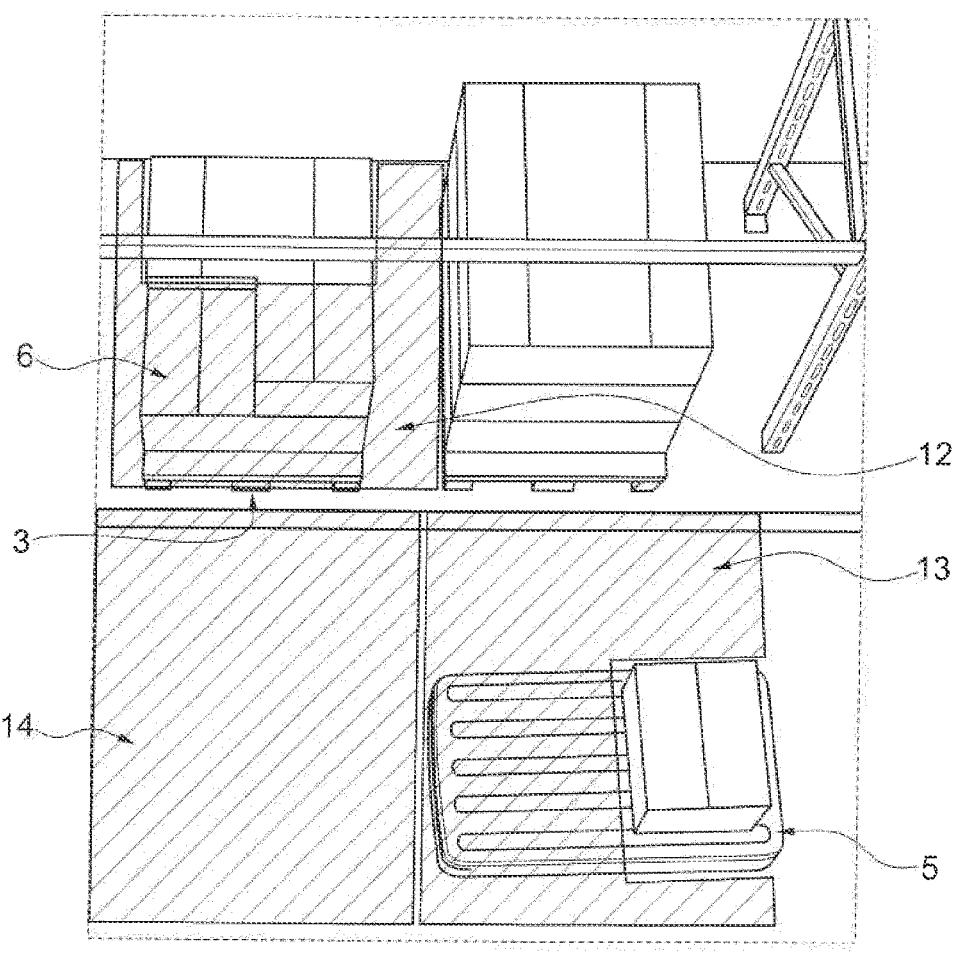
FIG. 4 is a plan view of the work spaces for load pickup, load deposition and the connecting work space in FIGS. 1 to 3.

FIG. 4 is a plan view of the work spaces 12, 13, 14. The work space 12, when the load is picked up from the individual load stack 6, and the work space 13, when the load is deposited on the autonomous vehicle 5, are connected by a third work space 14 which extends over the area in front of the pallet 3 and the autonomous vehicle 5.

Figure 5:
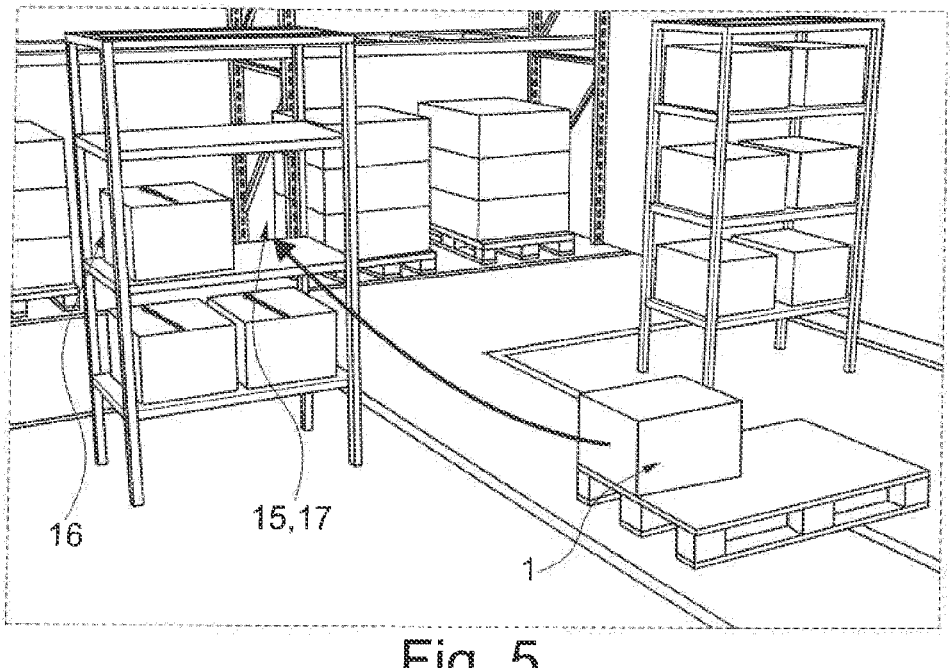
FIG. 5 illustrates a loading process of a load handling auxiliary device with an individual item.

FIG. 5 shows a loading process of a load handling auxiliary device 15 in the form of a shelf 17, with the individual item 1. The individual item can be a carton, a crate or a box, for example. In FIG. 5, the load handling kinematics required to move the load, preferably robotic arm kinematics, which are preferably located on a vehicle, are not shown. The load handling kinematics, which are preferably attached to the vehicle deposit the load, during which the individual item 1 is transported from the load carrier such as a pallet, for example, to the load handling auxiliary device 15 on which it is set down.

Figure 6:
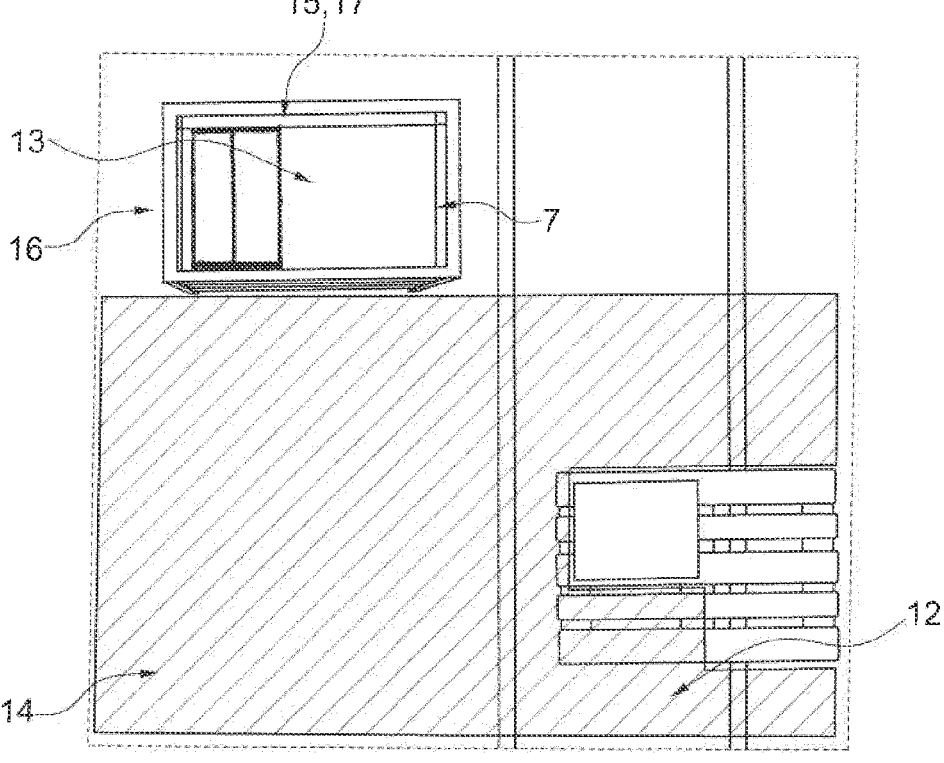
FIG. 6 illustrates a loading process of a load handling auxiliary device in FIG. 5 with connecting work space.

As shown in the plan view in FIG. 6, for this purpose the system identifies the work space 12 for the load pickup, the work space 13 for the load deposition and the connecting third work space 14. The work space 12 for the load pickup and the connecting work space 14 are identified analogous to FIG. 4. The identification of the work space 13 for the load deposition differs with regard to the determination because here the surrounding structure does not consist of "closed areas" but only shelf struts 16 of the load handling auxiliary device 15, which in this case is in the form of a shelf 17. In this case, the system recognizes that the open space 7 between the shelf struts 16 cannot be used as a work space 13 or can be used only to a limited extent and excludes this area.

Figure 7:
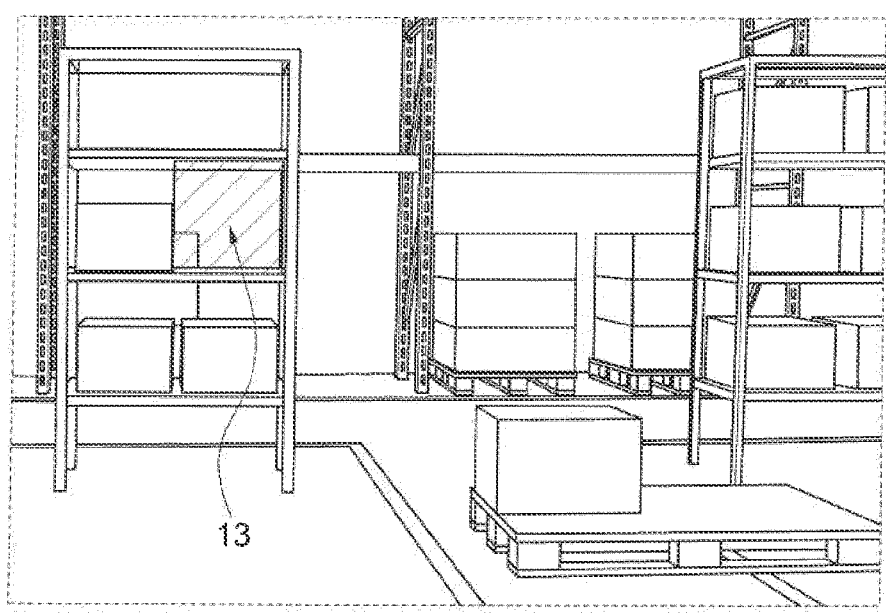
FIG. 7 illustrates a loading process of a load handling auxiliary device in FIG. 5 with load deposition in the work space.

FIG. 7 shows a head-on view of the load handling situation in FIG. 6 with the work space 13 for the deposition of the load.

Figure 8:
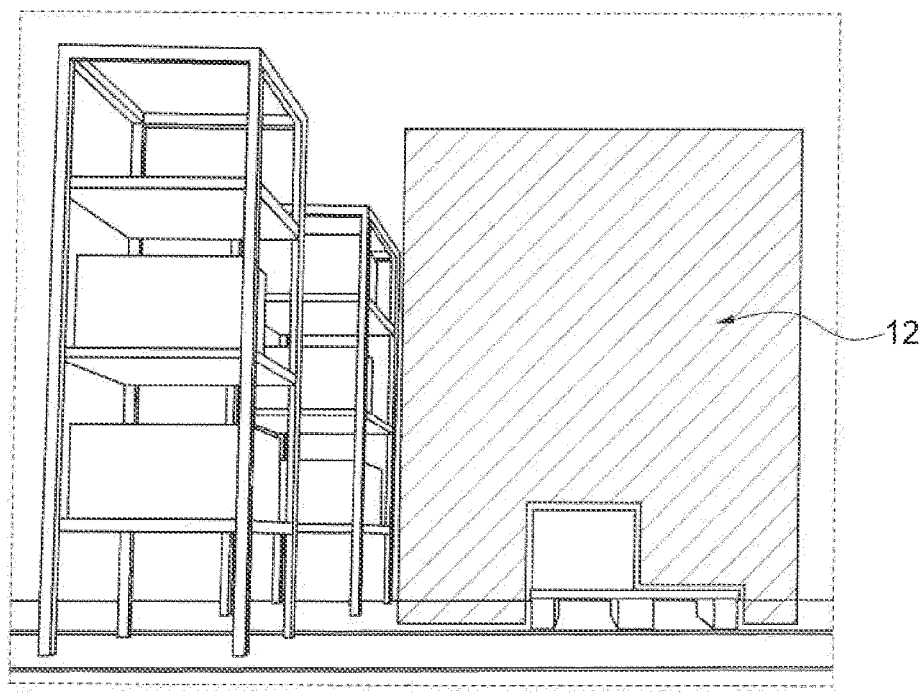
FIG. 8 illustrates a loading process of a load handling auxiliary device in FIG. 5 with connecting work space.

FIG. 8 shows a side view of the load handling situation in FIG. 6 with the work space 12 for the pickup of the load.

Figure 9:
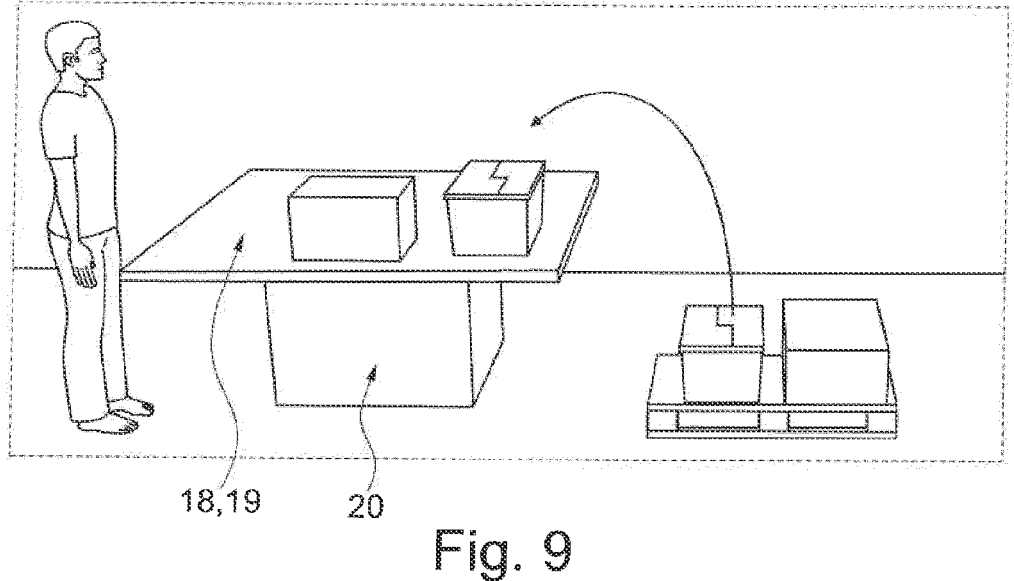
FIG. 9 shows a load handling situation in interaction with a tool.

FIG. 9 shows a load handling situation in interaction with a load handling auxiliary device 18 in the form of a workbench 19, for example. In this case, there is an irregular work and monitoring space which is broken up by indentations, as shown in FIG. 9 by the space 20 underneath the workbench 19. In FIG. 9, the load handling kinematics required to move the load, preferably robotic arm kinematics, which are preferably located on a vehicle, are not shown. The load handling kinematics, which are preferably attached to the vehicle, deposit the load, during which the individual item is transported from the load carrier such as a pallet, for example, to the workbench 19 on which it is set down.

The load handling process proceeds analogous to the process illustrated in FIGS. 1 to 4, because here too, there is a load movement from a first, in particular flat, surface to a second, in particular flat surface. However, the result of the determination of the monitoring space differs, because the area around the workbench 19 must be recessed to avoid a collision with it.

In this scenario, in contrast to the scenario illustrated in FIG. 4, there is no separate illustration of the work spaces 12 and 13 for the load pickup and load deposition and of the connecting work space 14.

Figure 10:
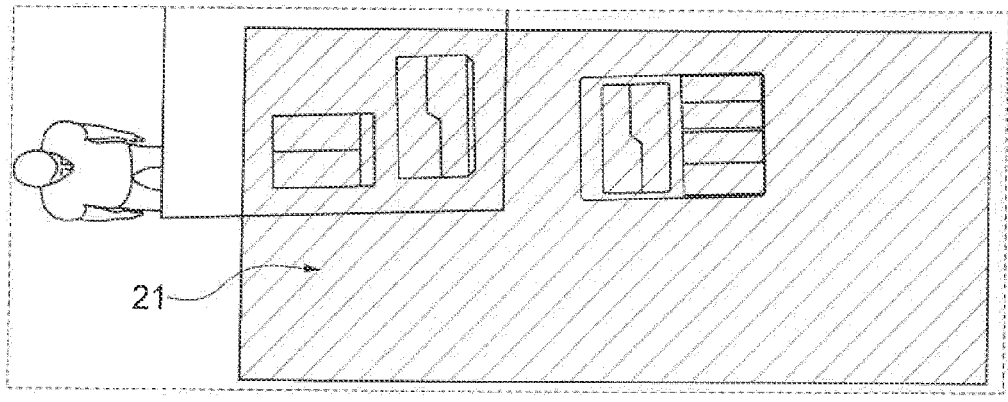
FIG. 10 is a plan view of the overall work space in FIG. 9.
Figure 11:
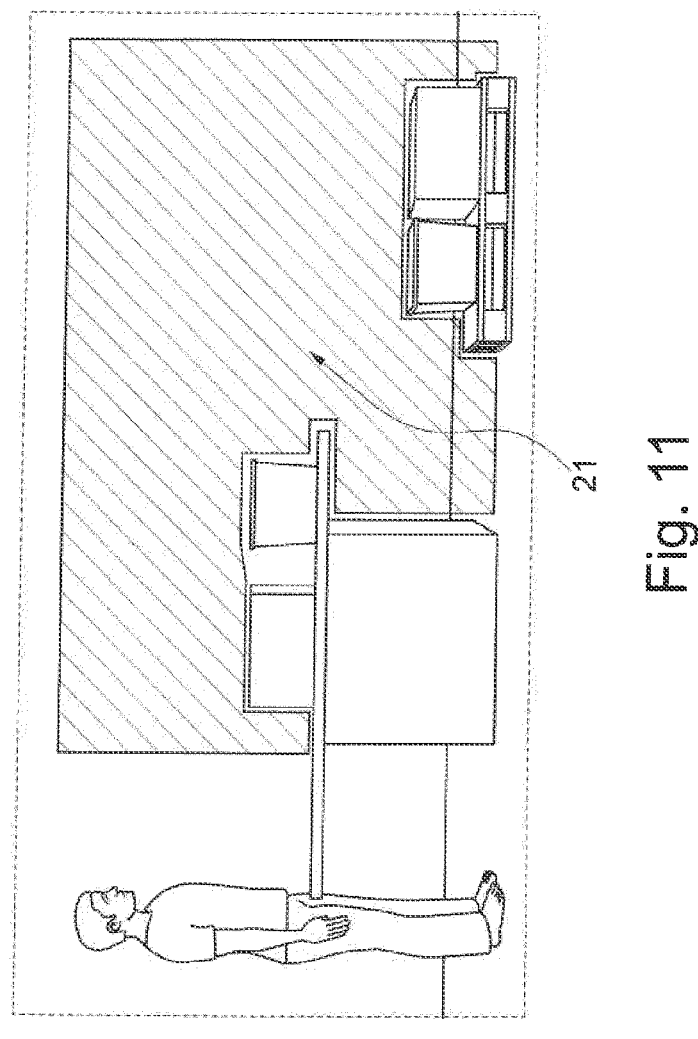
FIG. 11 is a head-on view of the overall work space in FIG. 9.

Instead, FIGS. 10 and 11 show an overall work space 21 that combines the work spaces 12, 13 and 14 from FIG. 4.

Figure 12:
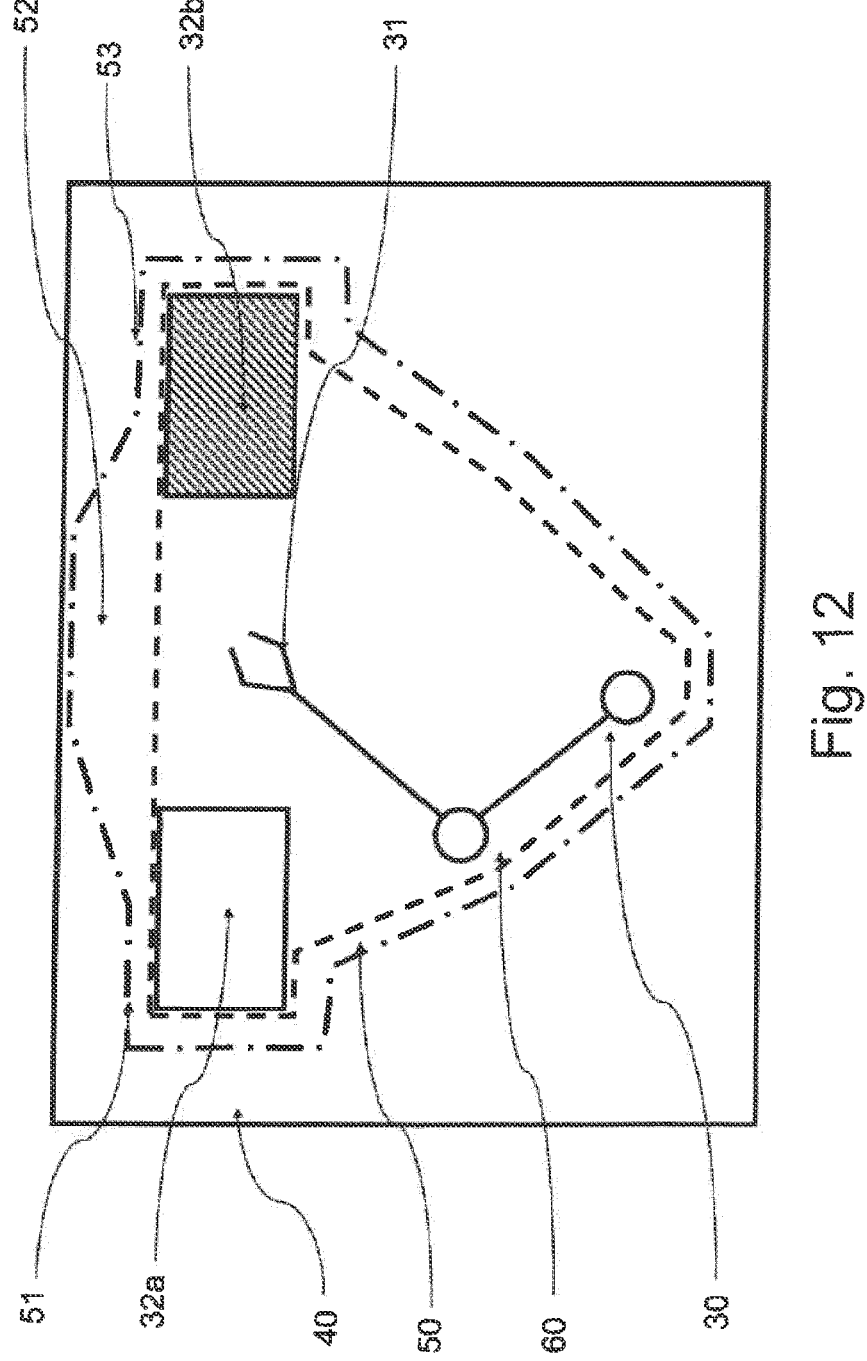
FIG. 12 is an illustration by way of example of a load handling environment.

FIG. 12 shows, by way of example, load handling kinematics 30 in the form of a robot arm kinematics with a gripper 31. Not shown in FIG. 12 is the location of these load handling kinematics 30 on a logistics robot. The load handling kinematics are configured to grab the load in a pickup position 32*a* and move it to a deposition position 32*b* and set it down there. In this case, the load handling kinematics 30 are preferably controlled as a function of a trajectory that is optimized in terms of the utilization of space.

The system can be associated with the load handling kinematics 30 and be configured to acquire data from the load handling environment by means of an environment sensing unit that in particular comprises a sensor system. By means of an environment monitoring unit that is in an operative connection with the environment sensing unit, the data can be analyzed to determine a work space 60 defined by a movement space of the load handling kinematics 30, a distance space that at least partly surrounds the work space 60 and a process space 40 or 50 that comprises the work space 60 and the distance space. For this purpose, the environment monitoring unit is configured to monitor, at least partly, at least the distance space and/or the process space 40 or 50.

The need for a given size of the distance space in particular is a function of different factors. In particular, for example, a speed of the load handling kinematics 30 can play a decisive role in the determination of the distance space. In FIG. 12, the distance space can be understood as the difference between the work space 60 and the process space 40 or 50, i.e. the space that lies between an external contour of the work space 60 and an external contour of the process space 40 or 50 and is defined by these external contours.

The process space 40, and accordingly the work space, is frequently determined as an all-inclusive total, in particular as a function of maximum speeds. Safety can thereby be guaranteed.

In particular, the process space 50, in particular the corresponding distance space, can be reduced to a minimum process-relevant space to be monitored, in particular as a function of the trajectory of the load handling kinematics 30 optimized in terms of utilization of space.

The load handling kinematics 30 reduce their speed of travel, in particular as they approach a load pickup position 32*a* and/or a load deposition position 32*b*. The speed of travel between the load pickup position 32*a* and the load deposition position 32*b* can be significantly higher. At elevated speeds of travel, it may be necessary in particular to increase the distance space and therefore the process space 50, to be able to decelerate the load handling kinematics 30 promptly in the event of the entry of an object into the distance space and/or a detected change in the distance space, so that the kinematics can come to a stop before reaching the area into which the object has entered and/or in which the change was detected. As a result of this configuration, the utilization of space can be optimized and at the same time safety can be increased.

In particular, therefore, an optimized process space 50 can be determined. The optimized process space 50 can be adapted in particular to the speed of travel and the design of the load handling kinematics 30. In particular, the process space 50 can be characterized by a minimum possible distance space in different areas. For example, a minimal distance space can be selected in a first section 51, in the vicinity of the load pickup position 32*a*, and in a third section 53 in the vicinity of the load deposition position 32*b*. In these areas, the load handling kinematics generally have a very low speed of travel so that they can pick up or deposit the load. Between these areas lies a second section 52, which is characterized in that the load handling kinematics generally travel at a higher rate of speed. Therefore here, a larger distance space is necessary and is taken into consideration in the layout of the optimized process space 50.

Figure 13:
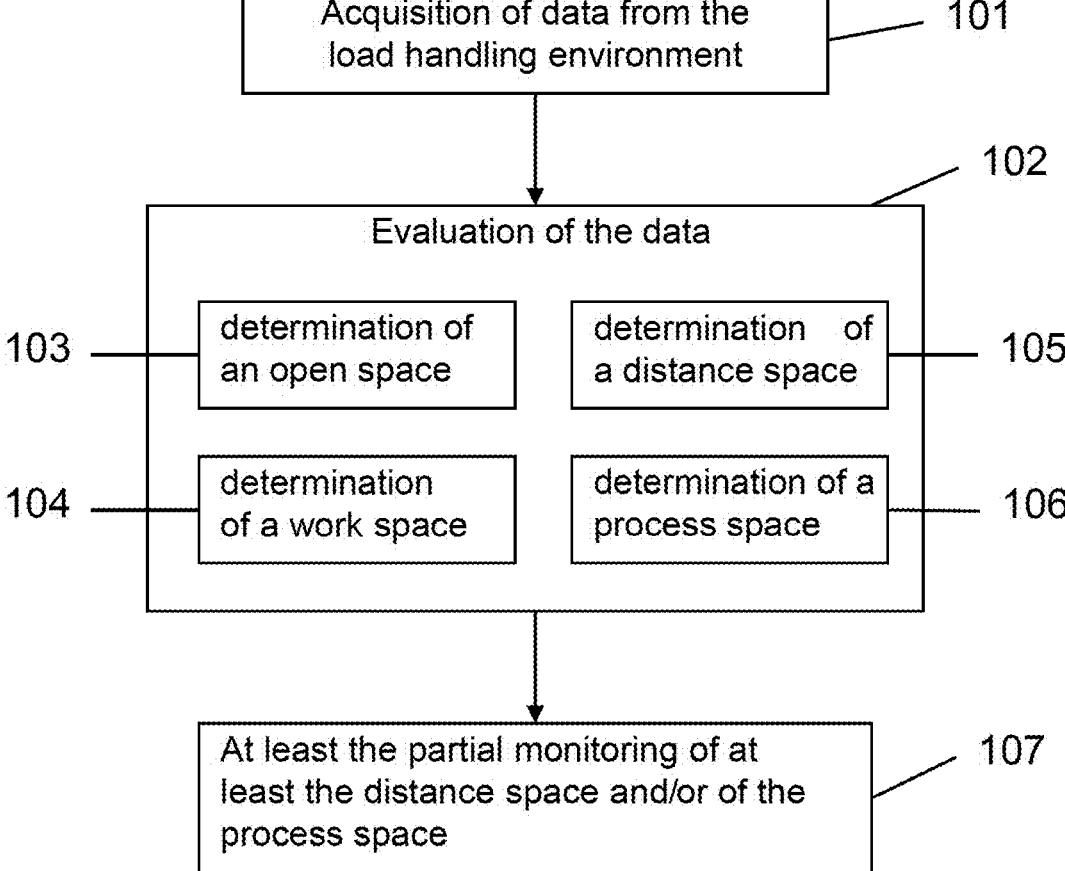
FIG. 13 shows, by way of example, the steps of a method to secure a load handling environment of load handling kinematics in a changing work environment.

FIG. 13 shows, by way of example, the sequence of steps of a method to secure a load handling environment of load handling kinematics in a changing work environment. The method illustrated by way of example comprises the steps:

acquisition of data from the load handling environment 101, in particular by means of an environment sensing unit, evaluation of the data 102, in particular by means of an environment monitoring unit in an operative connection with the environment sensing unit, comprising:

determination of an open space 103 surrounding a load to be handled, determination of a work space 104 defined by a movement space of the load handling kinematics, determination of a distance space 105 that at least partly surrounds the work space, determination of a process space 106 that comprises the work space and the distance space, and at least the partial monitoring of at least the distance space and/or of the process space 107, in particular by means of the environment monitoring unit.

The sequence of steps 103, 104, 105 and 106 illustrated by way of example can in particular be variable.

The invention claimed is:

1. A system for securing a load handling environment of load handling kinematics in a changing work environment, comprising:

an environment sensing unit configured to acquire data of the load handling environment; and an environment monitoring unit in an operative connection with the environment sensing unit, wherein the environment monitoring unit is configured to analyze the data in such a way that an open space surrounding a load to be handled and extending to adjacent structures, a work space defined by a movement space of the load handling kinematics, a distance space that at least partly surrounds the work space, and a process space that comprises the work space and the distance space are determined, and wherein the environment monitoring unit is configured to monitor, at least partly, at least the distance space and/or the process space, and to move the load handling kinematics based on at least the open space and/or the work space and/or the distance space and/or the process space.

2. The system according to claim 1, wherein the system is configured to be:

associated with a logistics robot with at least one load handling kinematics device, and/or associated with load handling kinematics that are configured to be located on an autonomous or manually guided vehicle, and/or associated with load handling kinematics that are configured to be located on a positioning unit so as to be positioned by the positioning unit in changing working environments, and/or associated with stationary load handling kinematics.

3. The system according to claim 2, wherein the logistics robot is a mobile robotic vehicle or an autonomous guided industrial vehicle.

4. The system according to claim 2, wherein the load handling kinematics is a robot arm.

5. The system according to claim 2, wherein the positioning unit is a positioning rail.

6. The system according to claim 1, wherein the environment monitoring unit comprises an electronic computer unit on which a computer program is stored that contains an algorithm configured to perform a calculation of free space and/or of the work space and/or of the distance space and/or of the process space, and wherein the calculation is performed by expansion of points in space sensed to be open space, starting from a point in space selected from points in space sensed to be open in an immediate vicinity of an action point that is a load grab point of the load, and extending to a detected boundary object or a specified stopping limit.

7. The system according to claim 6, wherein the algorithm is configured to:

perform a modeling of an enclosing surface contour of the open space and/or of the work space and/or of the distance space and/or of the process space, and/or perform a reduction of the free space and/or of the work space and/or of the distance space and/or of the process space to a convex surface contour, and/or a modeling of an overall space by a combination of subspaces of the open space and/or of the work space and/or of the distance space and/or of the process space, and/or perform a modeling of a non-convex total space by a combination of at least two convex sub-spaces of the open space and/or of the work space and/or of the distance space and/or of the process space.

8. The system according to claim 6, wherein the algorithm is configured to:

calculate the process space by addition of the work space and the distance space, and/or calculate the distance space by elimination of the work space from the process space, and/or monitor a total volume of the process space and or of the distance space, and/or determine an external contour and/or an internal contour of the distance space, wherein the algorithm is configured to monitor at least the external contour and/or the internal contour of the distance space.

9. The system according to claim 6, wherein the algorithm is configured to perform a calculation of a trajectory of the load handling kinematics that is optimized in terms of utilization of space and/or as a function of the trajectory optimized in terms of utilization of space to reduce the process space to a minimum process-relevant volume to be monitored as a function of the trajectory of the load handling kinematics optimized in terms of utilization of space.

10. The system according to claim 6, wherein:

the environment sensing unit comprises an optical sensor, and/or an alternative sensor system, and/or the environment sensing unit is electronically coupled with a central monitoring device, and is configured to receive signals from the central monitoring device that carry the data of the load handling environment, and/or the environment sensing unit is in an operative connection with an external supplemental sensor system, and/or the environment monitoring unit and/or the environment sensing unit is/are configured to receive data from the external supplemental sensor system, and/or the environment monitoring unit and/or the environment sensing unit is/are configured to merge the data from the external supplemental sensor system with the data from the environment sensing unit.

11. The system according to claim 10, wherein the optical sensor is a camera and/or a depth-sensing camera and/or a 2D laser scanner and/or a 3D laser scanner.

12. The system according to claim 10, wherein the alternative sensor system is a radar sensor and/or an ultrasound sensor.

13. The system according to claim 1, wherein the environment monitoring unit is configured, by analyzing the data, to form the process space:

in an area of stacked individual items in the process space that at least partly or completely surrounds a stacked individual item, and/or in an area of stacked individual items in the process space that at least partly or completely surrounds a stacked individual item and load handling auxiliary devices, and/or in an area of stacked individual items in the process space that at least partly or completely surrounds a stacked individual item and tools.

14. The system according to claim 13, wherein the load handling auxiliary devices are shelf elements and/or wherein the tools are workbenches.

15. A method for securing a load handling environment of load handling kinematics in a changing work environment, comprising the steps:

acquiring data from the load handling environment by use an environment sensing unit;

analyzing the data by an environment monitoring unit in an operative connection with the environment sensing unit;

determining an open space surrounding a load to be handled and extending to adjacent structures;

determining a work space defined by a movement space of the load handling kinematics;

determining a distance space that at least partly surrounds the work space;

determining a process space that comprises the work space and the distance space, at least partial monitoring of at least the distance space and/or of the process space by the environment monitoring unit; and moving the load handling kinematics based on at least the open space and/or the work space and/or the distance space and/or the process space.

16. The method according to claim 15, further comprising calculating the open space and/or of the work space and/or a distance space and/or of the process space by expansion of points in space recognized to be open space, starting from a point in space selected from points in space recognized to be open in an immediate vicinity of an action point comprising a load grab point of the load, and extending to a detected boundary object or a specified stopping limit, and wherein the calculation is performed by executing an algorithm that is contained in a computer program that is stored in an electronic computer unit of the environment monitoring unit.

17. The method according to claim 15, further comprising:

modeling an enclosing surface contour of the open space and/or of the work space and/or of the distance space and/or of the process space by the execution of the algorithm; and/or reducing the open space and/or of the work space and/or of the distance space and/or of the process space to a convex surface contour by executing the algorithm; and/or modeling an overall space by a combination of subspaces of the open space and/or of the work space and/or of the distance space and/or of the process space by executing the algorithm.

18. The method as according to claim 17, wherein the modeling step comprises modeling of a non-convex overall space by a combination of at least two convex subspaces of the open space and/or of the work space and/or of the distance space and/or of the process space by executing the algorithm.

19. The method according to claim 15, further comprising:

calculating the process space by addition of the work space and the distance space; and/or calculating the distance space by elimination of the work space from the process space; and/or monitoring of a total volume of the process space and or of the distance space; and/or determining an external contour and/or an internal contour of the distance space and monitoring at least of the external contour and/or of the internal contour of the distance space by executing the algorithm.

20. The method according to claim 15, further comprising calculating a trajectory optimized in terms of utilization of space of the load handling kinematics and/or reduction of the process space as a function of the trajectory optimized in terms of utilization of space to a minimum process-relevant volume to be monitored by executing the algorithm.

21. The method as claimed claim 15, further comprising:

positioning the load handling kinematics which comprises a logistics robot;

sensing the load handling environment during the positioning and/or an approach and/or after the positioning and/or after the approach of the logistics robot; and/or precise positioning of the logistics robot as a function of the load handling environment information acquired; and/or handing over control of the logistics robot back to a navigation control system or a supplemental control system after the completion of a load handling process.

* * * * *